May 28, 1929.  E. F. WESTON  1,714,651
TESTING APPARATUS
Filed June 24, 1925   3 Sheets-Sheet 2
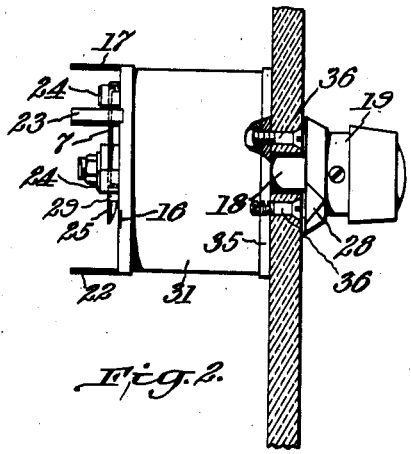
Fig. 2.
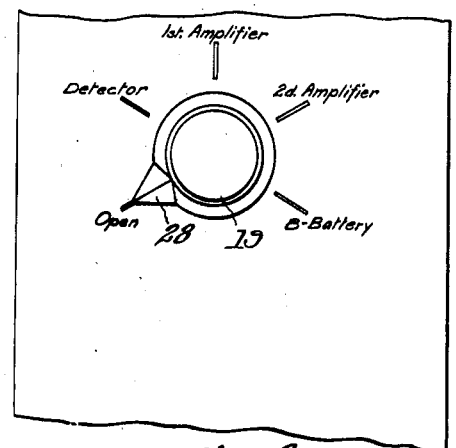
Fig. 3.
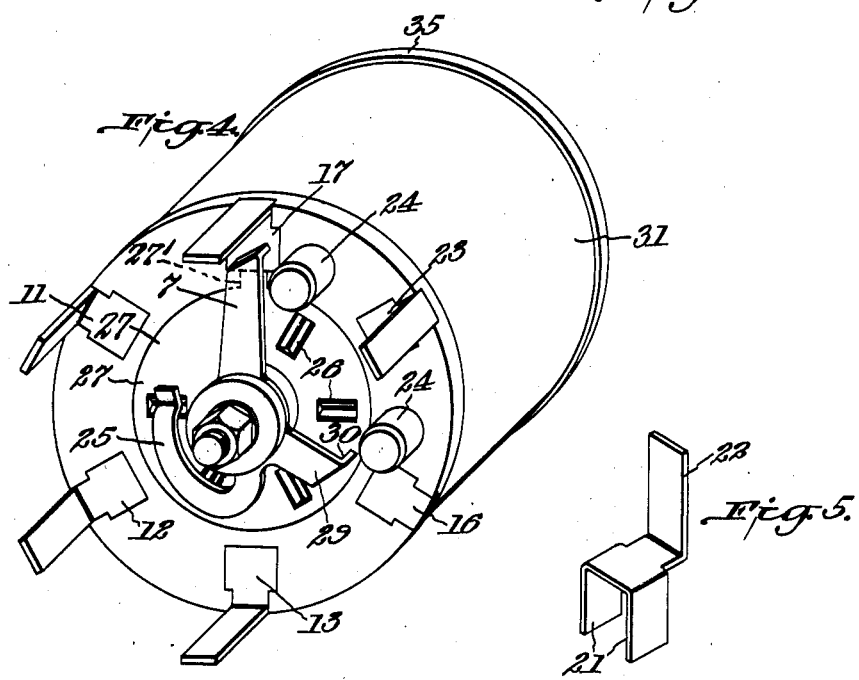
Inventor:
Edward F. Weston,
By Byrne Townsend & Brickenstein
Attorneys.

May 28, 1929.  E. F. WESTON  1,714,651
TESTING APPARATUS
Filed June 24, 1925   3 Sheets-Sheet 3

Patented May 28, 1929.

1,714,651

UNITED STATES PATENT OFFICE.

EDWARD F. WESTON, OF NEWARK, NEW JERSEY, ASSIGNOR TO WESTON ELECTRICAL INSTRUMENT CORPORATION, OF NEWARK, NEW JERSEY, A CORPORATION OF NEW JERSEY.

TESTING APPARATUS.

Application filed June 24, 1925. Serial No. 39,360.

This invention relates to testing apparatus, and particularly to testing apparatus including a single indicating instrument by means of which a property of two or more electric circuits may be indicated, the values of the quantity to be measured being of widely different magnitudes in the several circuits.

It is the present practice to measure voltage of two different orders by means of a voltmeter having low-range and high-range terminals. In connecting such a voltmeter to a plurality of circuits in such manner that the high or low voltages may be indicated at will, it is necessary to employ at least two switches, one of which must be left open while the other is in use. Systems of this type are not satisfactory since there is the possibility of damage if both switches are closed at the same time.

An object of the invention is to provide an efficient and compact testing apparatus which may be used in indicating electrical values of more than one order of magnitude. A further object is to provide a simple testing apparatus for indicating voltages of different circuit. More specifically an object of the invention is to provide a testing apparatus including a combined multi-point switch and multiplier located between an indicating instrument and a plurality of electrical circuits upon which are impressed voltages of different magnitudes. A further specific object of the invention is to provide a combined multi-point switch and multiplier which may be employed in an electrical testing circuit.

These and other objects of the invention may be attained by the embodiment which is shown in the accompanying drawings in which, Fig. 1 is a circuit diagram of the testing apparatus incorporated in a typical radio receiving circuit;

Fig. 2 is a side elevation of the combined switch and multiplier mounted upon an instrument panel;

Fig. 3 is a front elevation of the panel and operating knob;

Fig. 4 is a perspective view of the switch and multiplier unit;

Fig. 5 is a detail view, in perspective, of one of the switch points; and

Figure 1:
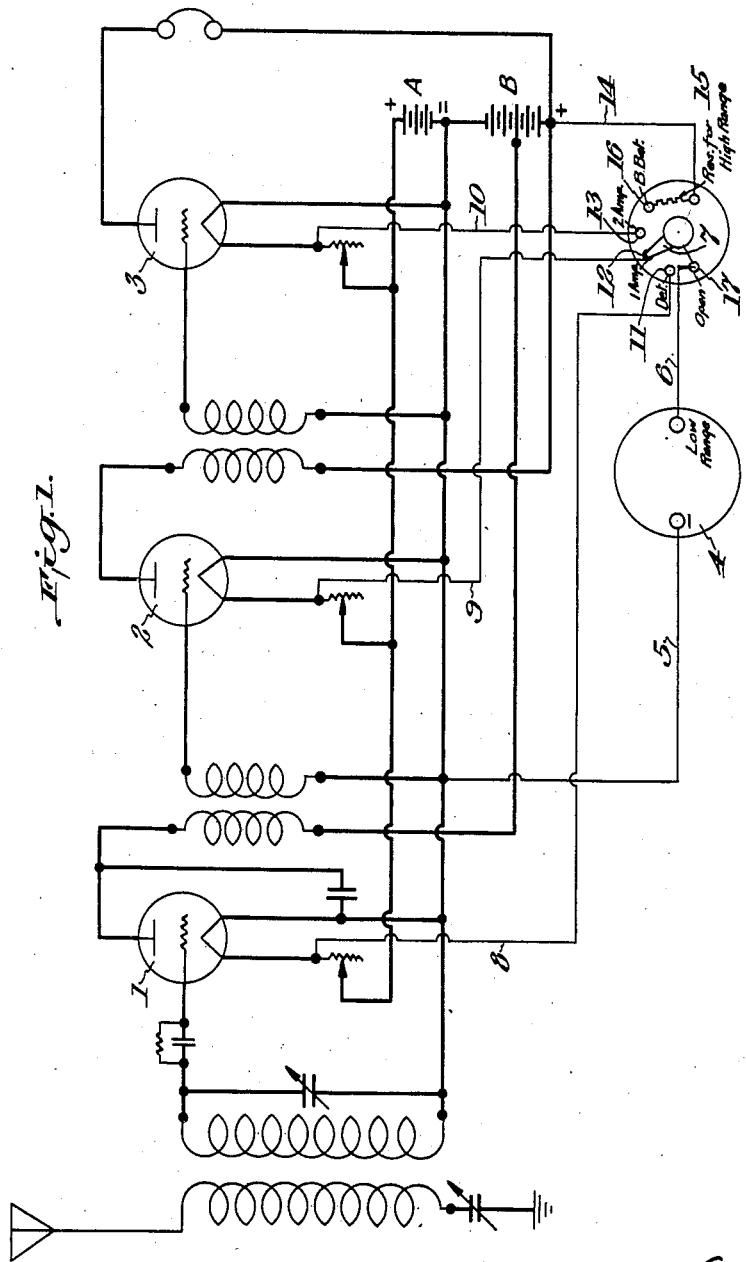
Figure 6:
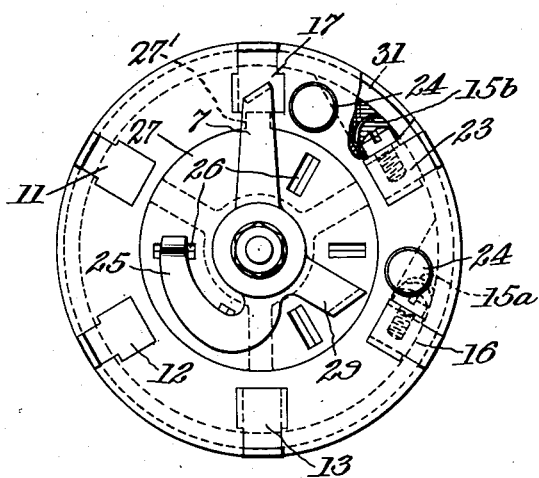
Figs. 6 and 7 are an end elevation and a central vertical section, respectively, of the switch and multiplier unit.
Figure 7:
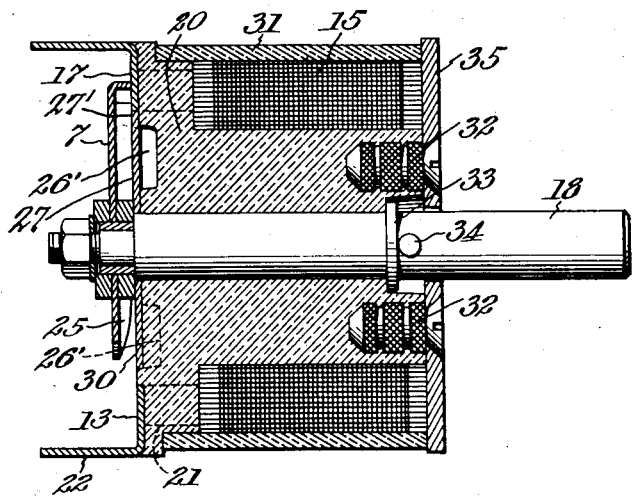

As shown in Fig. 1, the testing apparatus may be employed for indicating the voltage across the filaments of any one of a plurality of audions or for indicating the voltage of the B-battery. The radio receiver may include, for example, a detector tube 1 and audio amplifiers 2, 3 which are connected in any desired manner. So far as the present invention is concerned, the particular radio circuit employed is immaterial and no description of the same is thought necessary. The negative binding post or terminal of the voltmeter 4 is connected to the common or ground point of the radio receiver by a lead 5 and the other terminal of the voltmeter is connected through lead 6 and switch point 17 to the switch arm 7 of a combined multi-point switch and multiplier. Separate leads 8, 9 and 10 run from the high voltage terminals of the several audions to switch points 11, 12, 13, respectively, of the multi-point switch. A lead 14 extends from the positive terminal of the B-battery to one end of a multiplier unit 15, the opposite end of which is connected to a switch point 16 of the multi-point switch. The switch is preferably provided with a dead or open point 17 upon which the switch arm 7 may rest to open all circuits.

While the combined switch and multiplier may take various forms in different installations, Figs. 2 to 7 illustrate the form which I now prefer for use in radio receivers or in other places where economy of space is desirable. The multiplier coil 15 takes the form of an annular winding surrounding the operating shaft 18 of the switch and lying between the knob 19 and the switch arm 7. The multiplier coil and the switch points are embedded in and supported by a molded composition 20 such as phenolic resin. Each of the switch points is preferably stamped from a metal plate or strip to provide a pair of lugs 21, which extend into the body of plastic material, and, with the exception of the switch point 16, each is provided with a soldering lug 22. The terminals 15$^a$, 15$^b$ of the multiplier element 15 are connected, respectively, to one lug of the switch point 16, and to a terminal 23, which is identical in construction with the switch points, but with which the switch arm is prevented from contacting by spaced stops 24. The positive terminal of the B-battery is electrically connected to a lug on the terminal 23, but the B-battery can be connected to the voltmeter 4 only through the multiplier coil 15.

A flexible extension 25 on the switch arm 7 springs into one of a series of recesses 26 in the end plate 27 when the switch arm is positioned over a switch point. Depressions 26' are provided in the end of the body of plastic material to make room for the index recesses 26 in the metal plate. As the switch is preferably mounted behind the panel this indexing feature is of considerable importance. The knob 19 carries a pointer 28 which is so adjusted upon the shaft 18 as to align with one of the fiducial marks upon the panel when the spring arm 25 engages in the corresponding recess 26. The switch arm 7 also carries a contact arm 29 which rides upon the end plate 27 and terminates in a flange 30 of such width as to permit the passage of the arm over the several recesses 26. The electrical circuit between the switch arm 7 and the lead 6 from the voltmeter is completed by a lug 27' on the plate 27, which lug engages the switch point 17.

After the molding operation in which the switch points and the multiplier coil are embedded in the plastic body 20, an insulating sleeve 31 is slipped over the unit and the shaft 18 is placed in position. The forward end of the plastic body 20 is recessed to receive a collar 33 against which a pin 34 on the shaft 18 engages to hold the shaft against longitudinal movement. An end plate 35 which covers the forward end of the unit is attached by screws which engage bushings 32 embedded in the plastic. The plate 35 is provided with threaded openings for screws 36 which serve to attach the unit to a panel.

Although only relatively low voltages may be impressed across the voltmeter, it will be noted that both high and low voltages may be indicated through the simple manipulation of a multi-point switch. With this construction it is not possible to manipulate the switch in such manner as to impress simultaneously voltages from two different circuits upon the voltmeter.

It will be obvious that the invention contemplates the reading of voltages across any number of circuits upon which voltages of more than one order are impressed. Obviously more than one multiplier winding may be incorporated in the switch unit if voltages of more than two orders of magnitude are to be indicated. These and other changes which may be made in the several parts, their relative size, shape, position and location, fall within the scope of my invention as set forth in the following claims.

I claim:

1. A combined switch and multiplier unit comprising a cylindrical supporting body, an annular multiplier winding carried thereby, an operating shaft extending through said body and carrying a rotary switch arm, a circumferentially disposed set of switch contacts, and stop members preventing said switch arm from engaging one of said contacts, the terminals of said multiplier winding being connected respectively to one of the said contacts engageable by said switch arm and to the said contact not engageable thereby.

2. In a combined switch and multiplier unit, a supporting body, an annular multiplier winding carried thereby, an operating shaft extending through said winding and body, a rotary switch arm on said shaft, a plurality of circumferentially disposed switch contacts, an insulating sleeve surrounding said winding and body, and an end plate secured to said body and serving to secure said shaft and sleeve thereto.

In testimony whereof, I affix my signature.

EDWARD F. WESTON.